(12) United States Patent
Lee et al.

(10) Patent No.: US 8,883,315 B2
(45) Date of Patent: Nov. 11, 2014

(54) ADHESIVE COMPOSITION FOR GLASS BONDING, GLASS ASSEMBLY AND DISPLAY USING THE SAME

(75) Inventors: Woo-Ram Lee, Seoul (KR); In-Kyu Song, Pyungtaek-si (KR); Hye-Rim Kwon, Incheon (KR)

(73) Assignee: Dongwoo Fine-Chem Co., Ltd., Jeollabuk-do (KR)

( * ) Notice: Subject to any disclaimer, the term of this patent is extended or adjusted under 35 U.S.C. 154(b) by 41 days.

(21) Appl. No.: 13/482,024

(22) Filed: May 29, 2012

(65) Prior Publication Data

US 2012/0308833 A1    Dec. 6, 2012

(30) Foreign Application Priority Data

Jun. 1, 2011 (KR) .................. 10-2011-0052799

(51) Int. Cl.
*C09J 175/04* (2006.01)

(52) U.S. Cl.
USPC ..... 428/425.6; 428/1.32; 428/1.33; 428/1.62; 522/144

(58) Field of Classification Search
USPC ............ 428/1.32, 1.33, 1.62, 425.6; 522/144
See application file for complete search history.

(56) References Cited

U.S. PATENT DOCUMENTS

| | | | |
|---|---|---|---|
| 5,017,433 A * | 5/1991 | Chevreux et al. .......... | 428/425.6 |
| 6,398,892 B1 * | 6/2002 | Noguchi et al. ................ | 156/85 |
| 2006/0188725 A1 * | 8/2006 | Yoshida et al. ............ | 428/411.1 |
| 2009/0029100 A1 * | 1/2009 | Wigdorski et al. ............. | 428/98 |
| 2011/0021655 A1 * | 1/2011 | Smothers et al. ............... | 522/63 |

\* cited by examiner

*Primary Examiner* — Thao T. Tran
(74) *Attorney, Agent, or Firm* — The PL Law Group, PLLC

(57) ABSTRACT

Disclosed are an adhesive composition for glass bonding, a glass assembly and a display using the adhesive composition. The adhesive composition includes a urethane-acryl copolymer, a monomer mixture of an acrylic monomer having no hydroxyl group and a monomer having a hydroxyl group, an isocyanate cross-linking agent, and a photo-polymerization initiator. The adhesive composition has advantages of: favorable scattering prevention of broken glass pieces, excellent heat-resistant durability enabling prevention of damage to an image display apparatus caused by temperature change, no adverse effect upon transmittance of the image display apparatus, hence ensuring desired visibility.

15 Claims, 1 Drawing Sheet

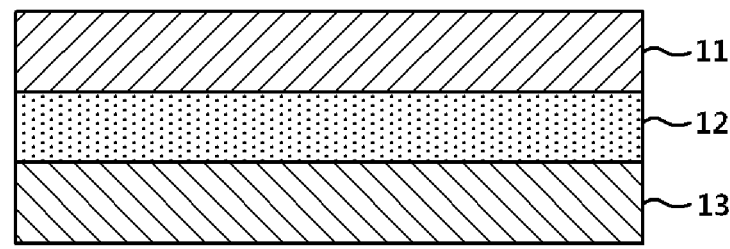

ADHESIVE COMPOSITION FOR GLASS BONDING, GLASS ASSEMBLY AND DISPLAY USING THE SAME

CROSS-REFERENCE TO RELATED APPLICATION AND CLAIM OF PRIORITY

This application claims priority to Korean Patent Application No. 10-2011-0052799, filed on Jun. 1, 2011, entitled, "Adhesive composition for glass bonding, glass assembly and display using the same", which is incorporated herein by reference in its entirety.

BACKGROUND

1. Field of the Invention

The present invention relates to an adhesive composition for glass bonding (or glass lamination), and a glass assembly and a display using the foregoing composition.

2. Description of the Related Art

A number of display devices such as liquid crystal displays (LCD), plasma display panels (PDP), electroluminescence (EL) devices, and the like, have been used more increasingly for various small-scale devices including, for example, a cellular phone, a PlayStation Portable® ('PSP'), a car navigation, a digital camera, a small-scale music or video player, or the like, as well as a digital information display (DID) which transfers specified information useable in, e.g., advertisements, interiors, electronic blackboards, etc.

As the foregoing image display devices are increasingly employed as described above, they are often used for both indoor and outdoor purposes. Meanwhile, serious problems such as fracture of a screen of the display due to weather change or damage of the same by external contaminants have increased.

In order to prevent the foregoing problems, lots of products wherein each has an additional window arranged on a screen of an image display device to protect the display screen have been currently released.

The protection window for a display screen mostly includes a glass assembly that typically includes two glass sheets bonded together via an adhesive as a medium. Such a glass assembly must have desired strength to prevent damage caused by external impact while stably protecting a display screen and, in the case that the glass is broken, safety of a user should be guaranteed by preventing the broken glass pieces from being scattered. Moreover, it is necessary to retain an original transmittance of an image display device, hence inhibiting display characteristics thereof from being reduced.

Korean Patent Registration No. 0629242 discloses a glass complex for protection of the screen of a mobile phone that includes a bonding resin layer interposed between a first glass and a second glass, wherein the bonding resin layer includes a transparent photo-curable resin including, in particular, isocyanurate resin, mercapto resin, methacrylate monomer, a photo-polymerization initiator and an organosilane compound. Such a glass complex shows excellent strength, hardness and anti-scattering effects, but has a transmission of 90 to 92% and hence may cause problems in terms of visibility of a display device.

SUMMARY

Therefore, one or more embodiments of the present invention has been proposed to solve the above problems in the related art and is directed to provision of an adhesive composition for glass bonding with favorable anti-scattering properties as well as excellent heat-resistant durability without adverse effects upon transmittance of an image display device.

Another aspect of the present invention is to provide a glass assembly (also referred to as 'laminated glass') bonded using the adhesive composition for glass bonding described above.

The other aspect of the present invention is to provide an image display device having the glass assembly described above.

According to an aspect of the present invention, an adhesive composition for glass bonding includes: a urethane-acryl copolymer; a monomer mixture of an acrylic monomer having no hydroxyl group and a monomer having a hydroxyl group; an isocyanate cross-linking agent; and a photo-polymerization initiator.

The acrylic monomer having no hydroxyl group may be a mixture of a mono-functional monomer and a multi-functional monomer.

The acrylic monomer having no hydroxyl group may include 95 to 99.9 wt. % of a mono-functional monomer and 0.1 to 5 wt. % of a multi-functional monomer based on the total weight of the acrylic monomer having no hydroxyl group.

The acrylic monomer having no hydroxyl group may include 98 to 99.9 wt. % of a mono-functional monomer and 0.1 to 2 wt. % of a multi-functional monomer based on the total weight of the acrylic monomer having no hydroxyl group.

The mono-functional monomer may be at least one selected from a group consisting of n-butyl(meth)acrylate, 2-butyl(meth)acrylate, t-butyl(meth)acrylate, isobutyl(meth)acrylate, hexyl(meth)acrylate, 2-ethylhexyl(meth)acrylate, ethyl(meth)acrylate, methyl(meth)acrylate, n-propyl(meth)acrylate, isopropyl(meth)acrylate, pentyl(meth)acrylate, n-octyl(meth)acrylate, isooctyl(meth)acrylate, 2-methylbutyl(meth)acrylate, n-nonyl(meth)acrylate, isononyl(meth)acrylate, isoamyl(meth)acrylate, n-decyl(meth)acrylate, isodecyl(meth)acrylate, isobornyl(meth)acrylate, 4-methyl-2-pentyl(meth)acrylate, dodecyl(meth)acrylate, lauryl(meth)acrylate, 2-ethoxylethyl(meth)acrylate, 2-methoxyethyl(meth)acrylate and allyl(meth)acrylate.

The multi-functional monomer may be at least one selected from a group consisting of 2 to 6-functional monomers.

The multi-functional monomer may be a 3-functional monomer.

The monomer having a hydroxyl group may be at least one selected from a group consisting of 2-hydroxyethyl(meth)acrylate; 2-hydroxylpropyl(meth)acrylate; 2-hydroxybutyl(meth)acrylate; 4-hydroxybutyl(meth)acrylate; 6-hydroxyhexyl(meth)acrylate; hydroxyalkyleneglycol(meth)acrylate having 2 to 4 carbon atoms in an alkylene group; (meth)acrylic acid; crotonic acid; maleic acid; itaconic acid; fumaric acid; 3-(meth)acryloyl propionate; a ring-opened adduct of succinic acid anhydride of 2-hydroxyalkyl(meth)acrylate having 2 to 3 carbon atoms in an alkyl group; a ring-opened adduct of succinic acid anhydride of hydroxyalkyleneglycol(meth)acrylate having 2 to 4 carbon atoms in an alkylene group; and a compound prepared by ring-opening addition type polymerization of a caprolactone adduct of 2-hydroxyalkyl(meth)acrylate having 2 to 3 carbon atoms in an alkyl group with succinic acid anhydride.

The monomer mixture is included in an amount of 500 to 1,000 wt. parts based on 100 wt. parts of the urethane-acryl copolymer in terms of solid contents.

The monomer mixture may be included in an amount of 600 to 800 wt. parts based on 100 wt. parts of the urethane-acryl copolymer, in terms of solid content.

The diluted mixture monomer may include 75 to 95 wt. % of an acrylic monomer having no hydroxyl group and 5 to 25 wt. % of a monomer having a hydroxyl group based on the total weight of the monomer mixture.

The diluted mixture monomer includes 80 to 90 wt. % of an acrylic monomer having no hydroxyl group and 10 to 20 wt. % of a monomer having a hydroxyl group.

According to an aspect of the present invention, a glass assembly includes two glass sheets and an adhesive layer interposed between the glass sheets, wherein the adhesive layer is formed by photo-curing the adhesive composition for glass bonding.

The adhesive layer may have a transmission of 95% or more and a haze of 0.5% or less.

According to an aspect of the present invention, an image display device includes the glass assembly.

Since the adhesive composition for glass bonding and the glass assembly fabricated using the same according to embodiments of the present invention have improved durability, in particular, heat-resistant durability, thus preventing damage of the image display device due to temperature change and, even if the glass is broken, inhibiting the broken glass pieces from being scattered. Consequently, it is possible to guarantee safety of a user. Furthermore, the present invention does not adversely affect the transmittance of the image display device because of high transmission and low haze of the glass assembly, thereby guaranteeing superior visibility.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a cross-sectional view illustrating a glass assembly according to one embodiment of the present invention.

DETAILED DESCRIPTION OF EXEMPLARY EMBODIMENTS

The present invention discloses an adhesive composition for glass bonding, and a glass assembly and a display using the foregoing composition.

The present invention will now be described more fully hereinafter with reference to the accompanying drawing.

The adhesive composition for glass bonding of an embodiment of the present invention includes a urethane-acryl copolymer; a monomer mixture of an acrylic monomer having no hydroxyl group and a monomer having a hydroxyl group; an isocyanate cross-linking agent; and a photo-polymerization initiator.

In the context herein, a urethane-acryl copolymer is a resin to give adhesiveness and may not be particularly limited in species or kinds thereof if it is used as an adhesive resin. For instance, a (meth)acrylate monomer having a hydroxyl group, a diisocyanate compound and/or a polyol copolymer may be used. Herein, (meth)acrylate refers to both acrylate and methacrylate.

The (meth)acrylate monomer having a hydroxyl group may include, for example, 2-hydroxyethyl(meth)acrylate, 2-hydroxypropyl(meth)acrylate, 2-hydroxybutyl(meth)acrylate, 4-hydroxybutyl(meth)acrylate, 6-hydroxyhexyl(meth)acrylate, and hydroxyalkylene (having 2 to 4 carbon atoms) glycol(meth)acrylate such as 2-hydroxyethyleneglycol(meth)acrylate and 2-hydroxypropyleneglycol(meth)acrylate, and the like, which may be used alone or as a mixture of two or more thereof.

The diisocyanate compound may include, for example, 1,6-hexamethylene diisocyanate, 4,4-dicyclohexylmethane diisocyanate, isophorone diisocyanate, 1,4-dicyclohexylene diisocyanate, diphenylmethane diisocyanate, tetramethylxylene diisocyanate, xylene diisocyanate, trimethylhexamethylene diisocyanate, tolylene diisocyanate, and the like, which may be used alone or as a mixture of two or more thereof.

Polyol may include, for example, polypropyleneglycol, polyethyleneglycol, polytetrahydrofuranglycol, polycaprolactone polyol, polybutadieneglycol, and the like.

According to an embodiment of the present invention, the urethane-acryl copolymer may be a copolymer copolymerized with the materials described above and optionally at least one polymerizable monomer such as monomers having cross-linkable functional groups, for example, a monomer having a carboxyl group, a monomer having an amide group, a monomer having a tertiary amine group and a monomer having a vinyl group.

The urethane-acryl copolymer configured as described above may be fabricated by any conventional method known in the art. For instance, reacting a diisocyanate compound with polyol in desired equivalent ratio thereof may prepare an isocyanate pre-polymer, which in turn reacts with (meth)acrylate monomer having a hydroxyl group in a desired equivalent ratio thereof to produce the copolymer.

According to an embodiment of the present invention, the urethane-acrylate copolymer has a dynamic viscosity ranging from 1,000 to 1,000,000 mPa·s and, more particularly, 1,000 to 500,000 mPa·s at 25° C. when a solid content thereof is 35%. If the dynamic viscosity is less than 1,000 mPa·s, the copolymer may lack cohesion and hence may cause problems in adhesion. On the other hand, if the dynamic viscosity is more than 1,000,000 mPa·s, a large amount of a dilution solvent may be required.

In the context of the present invention, a diluted monomer, having a functional group cross-linkable with the urethane-acryl copolymer while simultaneously controlling the viscosity of the adhesive composition, used herein may be particularly a monomer mixture of an acrylic monomer having no hydroxyl group and a monomer having a hydroxyl group.

In this regard, the acrylic monomer having no hydroxyl group may control elastic modulus of an adhesive, and the monomer having a hydroxyl group is a component to increase adhesion thereof to a glass. In the case where either of the above two components is used alone, adhesive properties such as adhesiveness or elastic modulus may be deteriorated somewhat. Furthermore, visibility of an image display device may be considerably deteriorated. More particularly, if an acrylic monomer having no hydroxyl group is used alone, adhesiveness is decreased while a haze value is considerably increased although elastic modulus may be controlled. On the other hand, if a monomer having a hydroxyl group is used alone, it is difficult to suitably control elastic properties, and an increase in haze value and yellowing may be caused, although strong adhesion can be achieved. Therefore, the embodiment of the present invention uses a mixture of an acrylic monomer having no hydroxyl group and a monomer having a hydroxyl group with optimum contents thereof, in order to ensure desired adhesive properties and transmission.

Examples of the acrylic monomer having no hydroxyl group may include any of a mono-functional monomer and a multi-functional monomer having 2 through 6-functional groups, which may be used alone or in combination with two or more thereof.

Examples of the mono-functional monomer may include at least one selected from a group consisting of n-butyl(meth)acrylate, 2-butyl(meth)acrylate, t-butyl(meth)acrylate, isobutyl(meth)acrylate, hexyl(meth)acrylate, 2-ethylhexyl (meth)acrylate, ethyl(meth)acrylate, methyl(meth)acrylate, n-propyl(meth)acrylate, isopropyl(meth)acrylate, pentyl (meth)acrylate, n-octyl(meth)acrylate, isooctyl(meth)acrylate, 2-methylbutyl(meth)acrylate, n-nonyl(meth)acrylate, isononyl(meth)acrylate, isoamyl(meth)acrylate, n-decyl (meth)acrylate, isodecyl(meth)acrylate, isobornyl(meth) acrylate, 4-methyl-2-pentyl(meth)acrylate, dodecyl(meth) acrylate, lauryl(meth)acrylate, 2-ethoxyethyl(meth) acrylate, 2-methoxyethyl(meth)acrylate and allyl(meth) acrylate.

Examples of the multi-functional monomer may include; a 2-functional monomer such as 1,3-buthanediol di(meth)acrylate, 1,4-buthanediol di(meth)acrylate, 1,6-hexanediol di(meth)acrylate, 2-butyl-2-ethyl-1,3-propanediol diacrylate, 1,9-nonanediol diacrylate, ethylene glycol di(meth) acrylate, bisphenol A-ethylene glycol diacrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, neopentyl glycol di(meth)acrylate, dicyclopentanyl di(meth)acrylate, caprolactone-modified dicyclopentenyl di(meth)acrylate, di(acryloxyethyl)isocyanurate, allylated cyclohexyl di(meth)acrylate, dimethylol dicyclopentane diacrylate, neopentylglycol-modified trimethylolpropane diacrylate, adamantine diacrylate, etc.; a 3-functional monomer such as trimethylolpropane tri(meth)acrylate, pentaerythritol tri(meth)acrylate, dipentaerythritol tri(meth)acrylate, propylene oxide-modified trimethylolpropane tri(meth)acrylate, tris(acryloxyethyl)isocyanurate, etc.; a 4-functional monomer such as pentaerythritol tetra(meth)acrylate, ditrimethylolpropane tetra (meth)acrylate, tetramethylolpropane tetra(meth)acrylate, etc.; a 5-functional monomer such as dipentaerythritol penta (meth)acrylate; a 6-functional monomer such as dipentaerythritol hexa(meth)acrylate, or the like. Among these, a 3 to 6-functional monomer may be used, and a 3-functional monomer such as trimethylolpropane tri(meth)acrylate may be used.

An embodiment of the present invention may use a mixture of a mono-functional monomer and a multi-functional monomer which are selected from the acrylic monomers having no hydroxyl group. In the case wherein the mixture of such a mono-functional and multi-functional monomers are used, favorable adhesiveness and desired cross-linkage density may be achieved to hence efficiently improve heat-resistant durability.

The mono-functional monomer may be included in an amount of 95 to 99.9% by weight ('wt. %'), for example, 98 to 99.8 wt. % based on the total weight of the acrylic monomer having no hydroxyl group, while a content of the multi-functional monomer in the acrylic monomer may range from 0.1 to 5 wt. %, for example, 0.1 to 2 wt. % based on the total weight of acrylic monomer having no hydroxyl group. If the content of the mono-functional monomer is more than 99.9 wt. % or the content of the multi-functional monomer is less than 0.1 wt. %, cross-linkage density may be reduced to render cohesiveness to be decreased, thus deteriorating heat-resistant durability. When the content of the mono-functional monomer is less than 95 wt. % or the content of the multi-functional monomer is more than 5 wt. %, cross-linkage density is reduced to hence render adhesiveness to be decreased although cohesiveness is improved. Moreover, in the case of applying the foregoing monomers to a substrate, adhesive properties may be deteriorated.

An acrylic monomer having no hydroxyl group may be contained in an amount of 75 to 95 wt. %, for example, 80 to 90 wt. % based on the total weight of the monomer mixture, while content of a monomer having a hydroxyl group may range from 5 to 25 wt. %, and for example, 10 to 20 wt % based on the total weight of acrylic monomer having no hydroxyl group. If the content of the acrylic monomer having no hydroxyl group is less than 75 wt. % or the content of the monomer having a hydroxyl group is more than 25 wt. %, yellow index (YI) is increased and hence may lead to yellowing. On the other hand, when the content of the acrylic monomer having no hydroxyl group is more than 95 wt. % or the content of the monomer having a hydroxyl group is less than 5 wt. %, haze may be increased.

The monomer mixture may be included in an amount of 500 to 1,000 wt. parts, for example, 600 to 800 wt. parts based on 100 wt. parts of the urethane-acryl copolymer. If the content of the mixture is less than 500 wt. parts, viscosity is relatively high and a time required to eliminate bubbles may be extended to cause deterioration in processing ability. On the other hand, if the content of the mixture exceeds 1,000 wt. parts, a contraction ratio is increased during hardening to decrease adhesion to a substrate during bonding, thus causing problems of product failure.

An isocyanate cross-linking agent is a component to suitably cross-link the urethane-acryl copolymer in order to increase cohesion, and may not be particularly limited in types or species thereof if it is commonly known in the related art. More particularly, an diisocyanate compound such as tolylene diisocyanate, xylene diisocyanate 2,4-diphenylkmethane diisocyanate, 4,4-diphenylmethane diisocyanate, hexamethylene diisocyanate, isophorone diisocyanate, tetramethylxylene diisocyanate, naphthalene diisocyanate, etc.; an adduct obtained by reacting 3 moles of a diisocyanate compound to 1 mole of polyalcohol compound, such as trimethylolpropane; isocyanurate obtained by self-condensation of 3 moles of a diisocyanate compound; a burette product obtained by condensing diisocyanate urea provided from 2 moles of a diisocyanate compound among 3 moles thereof with the remaining 1 mole of diisocyanate; and a multi-functional isocyanate compound containing three functional groups such as triphenylmethane triisocyanate, methylene bis-triisocyanate, etc., may be exemplified. Among these, isophorone diisocyanate may be used. The foregoing materials may be used alone or in combination with two or more thereof.

The isocyanate cross-linking agent may be added in an amount of 0.1 to 2 wt. parts, for example, 0.5 to 1.5 wt. parts based on 100 wt. parts of a urethane-acryl copolymer, in terms of solid content. In the case where content of the cross-linking agent is less than 0.1 wt. parts, cohesion may be insufficient. On the other hand, if the content exceeds 2 wt. parts, cohesion is considerably increased to reduce adhesiveness and, when it is applied to a substrate, adhesion thereto may be deteriorated.

A photo-polymerization initiator is a component to sufficiently cure the adhesive composition and may not be particularly limited in types or species thereof if it is commonly known in the related art. More particularly, benzoin, benzoin methylether, benzoin ethylether, benzoin isopropylether, benzoin-n-butylether, benzoin isobutylether, acetophenone, hydroxydimethyl acetophenone, dimethylamino acetophenone, dimethoxy-2-phenyl acetophenone, 3-methyl acetophenone, 2,2-dimethoxy-2-phenyl acetophenone, 2,2-diethoxy-2-phenyl acetophenone, 4-chloroacetophenone, 4,4-dimethoxyacetophenone, 2-hydroxy-2-methyl-1-phenylpropane-1-one, 4-hydroxy cyclophenylketone, 1-hydroxy cyclohexylphenylketone, 2-methyl-1-[4-(methylthio)phenyl]-2-morpholino-propane-1-one, 4-(2-hydroxyethoxy)

phenyl-2-(hydroxyl-2-propyl)ketone, benzophenone, p-phenylbenzophenone, 4,4-diaminobenzophenone, 4,4'-diethylaminobenzophenone, dichlorobenzophenone, anthraquinone, 2-methylanthraquinone, 2-ethylanthraquinone, 2-t-butylanthraquinone, 2-aminoanthraquinone, β-chloroanthraquinone, 2-methylthioxantone, 2-ethylthioxantone, 2-chlorothioxantone, 2,4-dimethylthioxantone, 2,4-diethylthioxantone, benzyl dimethylketal, diphenylketone benzyldimethylketal, acetophenone dimethylketal, p-dimethylaminobenzoic ester, 2,4,6-trimethylbenzoyl diphenylphosphine oxide, fluorene, triphenylamine, carbazole, benzyldiphenyl sulfide, tetramethylthiuram monosulfide, or the like may be exemplified. Furthermore, commercially available products such as Darocur 1173, Irgacure 184, Irgacure 907 (trade names, manufactured by Ciba Co. Ltd.) may also be used. The foregoing photo-polymerization initiators may be used alone or in combination with two or more thereof.

The photo-polymerization initiator may be added in an amount of 0.1 to 10 wt. parts for example, 0.3 to 5 wt. parts relative to 100 wt. parts of the urethane-acryl copolymer, in terms of solid content thereof. In the case where content of the above initiator is less than 0.1 wt. parts, a curing velocity may become slow. On the other hand, when the content is more than 10 wt. parts, yellowing may be caused and/or durability may be reduced.

In order to improve bonding force, the adhesive composition may further include a silane coupling agent.

Such a silane coupling agent may include, for example; vinyl chlorosilane, vinyl trimethoxysilane, vinyl triethoxysilane, 2-(3,4-epoxy cyclohexyl)ethyl trimethoxysilane, 3-glycidoxypropyl trimethoxysilane, 3-glycidoxypropyl methyldiethoxysilane, 3-glycidoxypropyl diethoxysilane, 3-glycidoxypropyl triethoxysilane, p-styryl trimethoxysilane, 3-methacryloxypropyl triethoxysilane, 3-methacryloxypropyl trimethoxysilane, 3-methacryloxypropylmethyl dimethoxysilane, 3-methacryloxypropylmethyl diethoxysilane, 3-acryloxypropyl trimethoxysilane, N-2-(aminoethyl)-3-aminopropylmethyl dimethoxysilane, N-2-(aminoethyl)-3-aminopropyl trimethoxysilane, N-2-(aminoethyl)-3-aminopropylmethyl triethoxysilane, 3-aminopropyl trimethoxysilane, 3-aminopropyl triethoxysilane, 3-triethoxysilyl-N-(1,3-dimethylbutylidene)propylamine, N-phenyl-3-aminopropyl trimethoxysilane, 3-chloropropyl trimethoxysilane, 3-mercaptopropylmethyl dimethoxysilane, 3-mercaptopropyl trimethoxysilane, bis(triethoxysilylpropyl)tetrasulfide, 3-isocyanatepropyl triethoxysilane, or the like, which may be used alone or in combination with two or more thereof.

The silane coupling agent may be added in an amount of 0 to 10 wt. parts, for example, 0.005 to 5 wt. parts relative to 100 wt. parts of the urethane-acryl copolymer, in terms of solid content thereof. In the case where content of the coupling agent is more than 10 wt. parts, durability may be reduced.

Other than the foregoing various components, the adhesive composition of the present invention may further include different additives, e.g., a bonding resin, an antioxidant, a corrosion-resistant agent, a leveling agent, a surface lubricant, dye, pigment, a defoaming agent, a filler, a photo-stabilizer, and so forth, so as to control desired bonding force, cohesion, viscosity, elastic modulus, a glass transition temperature, color, or the like, depending upon uses thereof.

Since the adhesive composition for glass bonding having the above mentioned construction according to the embodiment of the present invention have improved durability, in particular, heat-resistant durability, thus preventing damage of the image display device due to temperature change and, even if the glass is broken, inhibiting the broken glass pieces from scattering. Consequently, it is possible to guarantee safety of a user. Furthermore, the present invention does not adversely effects the transmittance of the image display device because of high transmission and low haze of the glass assembly, thereby guaranteeing superior visibility.

Meanwhile, an embodiment of the present invention may provide a glass assembly fabricated using the adhesive composition for glass bonding, as described above.

As shown in FIG. 1, the glass assembly according to the embodiment of the present invention may include a first glass sheet 11 and a second glass sheet 13 by interposing an adhesive layer 12 therebetween, wherein the adhesive layer is prepared through photo-curing using the adhesive composition for glass bonding.

The first glass sheet 11 is a reinforced glass positioned at a viewing side while the second glass sheet 13 is another reinforced glass placed at an image display panel side. Types and/or kinds thereof may not be particularly limited.

In addition, a thickness of each of the first and second glass sheets 11 and 13 is not particularly limited and, for example, may range from 0.1 to 6 mm, for another example, 0.1 to 3 mm.

Each of the first and second glass sheets may have any functional coating layer such as an anti-static layer, anti-fog layer, anti-fingerprint layer, reflection-free coating layer, hard coating layer, or the like, to be formed thereon.

The adhesive layer 12 is a layer formed by photo-curing the adhesive composition for glass bonding according to the embodiments of the present invention and serves to bond the first and second glass sheets 11 and 13 together.

A thickness of the adhesive layer 12 is not particularly limited but may range from 0.1 to 5 mm, for example, 0.3 to 3 mm.

The adhesive layer 12 may have a transmission of not less than 95% and a haze of not more than 0.5%. If the transmission is less than 95% or the haze exceeds 0.5%, visibility of an image display device may be decreased.

As such, the adhesive layer 12 is prepared using the adhesive composition for glass bonding of the embodiments of the present invention, serves to bond the first and second glass sheets together, shows excellent heat-resistant durability and, when the glass is fractured, may efficiently inhibit broken glass pieces from being dispersed (i.e., scattering or flying in all directions). Moreover, the above adhesive layer does not influence transmittance of a display panel, thus rendering the display panel to have desired display quality.

A glass assembly may be fabricated, for example, according to the following procedures.

After removing impurities from bonding faces of first and second glass sheets to be bonded together, an adhesive composition for glass bonding is applied to either of the bonding faces of the first and second glass sheets, followed by drying the coated face. The coating process is not particularly limited so far as it is commonly known in the related art and may include, for example, a bar coater, an air knife, gravure, a reverse roll, a kith roll, a spray, a blade, a die coater, casting, spin-coating, and so forth. Drying may be conducted at 20 to 150° C. for 1 second to 2 hours. According to an embodiment of the present invention, the foregoing process may be performed for 5 seconds to 1 hour. After coating and drying, the resultant composition is further subjected to bonding of the other glass sheets with the composition and then close adhesion using a compression roller. By photo-curing of the above assembly, an adhesive layer is formed and, hence, renders a glass assembly including the first and second glass sheets bonded together.

A light source for photo-curing may include UV rays. For instance, UV rays having main wavelength in the range of 300 to 400 nm and output power in the range of 30 to 50 W may be radiated for 1 to 60 minutes. In this regard, a distance to the assembly may range from 10 to 50 cm while maintaining an interval between lamps in the range of 10 to 50 cm.

In addition, after removing impurities from bonding faces of the first and second glass sheets to be bonded together, a two-sided adhesive tape is attached around one of these glass sheets except an input port and an air vent thereof. Thereafter, the treated glass sheet overlaps with the bonding face of the other glass sheet, followed by being firmly pressed using a clamp. Through the remaining input port, the adhesive composition for glass bonding is introduced using a pump or a vinyl tube to fill an empty space. Following this, the input port and the air vent in an open state are sealed using a sealant. The sealed assembly may be subjected to photo-curing to prepare an adhesive layer, hence enabling formation of a glass assembly having the first and second glass sheets bonded together.

Such a glass assembly may be applicable to, for example, liquid crystal displays (LCD), plasma display panels (PDP), electroluminescence (EL) devices, and so forth. More particularly, the glass assembly is provided on a display panel of an image display device to prevent the image display device from being damaged by temperature change without adverse effects upon transmittance off the display panel. Further, even when the glass is broken, scattering of the broken glass pieces may be successfully inhibited.

Exemplary embodiments will be described to more concretely understand the present invention with reference to examples and comparative examples. However, it will be apparent to those skilled in the art that such embodiments are provided for illustrative purposes and do not limit subject matters to be protected as defined by the appended claims.

EXAMPLE

Example 1

(1) Adhesive Composition

In terms of solid content, 100 wt. parts of a urethane-acryl copolymer (HSC-2025, manufactured by Hansu Chemical; a dynamic viscosity at 25° C. of 3600 mPa·s) and 700 wt. parts of a diluted monomer prepared by blending a mixture of 2-ethylhexyl acrylate and trimethylolpropane triacrylate (TMPTA) in a mixing ratio of 99.88 wt. %:0.12 wt. % with acrylic acid in a blending ratio of 85.8 wt. %:14.2 wt. %, were admixed and then 1 wt. parts of isophorone diisocyanate (IPDI, BASF Co.), 1 wt. parts of a photo-polymerization initiator (Irgacure 184, Ciba Co.) and 1 wt. parts of 3-nmethacryloxypropyl trimethacryloxypropyl trimethoxysilane (KBM-503, Shinetsu Co.) as a silane coupling agent were added to the above prepared mixture, followed by mixing the same for 10 minutes, thus preparing an adhesive composition.

(2) Glass Assembly

Using ethanol, each bonding face of two glass sheets having a thickness of 5 mm, was cleaned to remove impurities therefrom. A two-sided adhesive tape was attached around the bonding face of one among these sheets except an input port and an air vent of the same, and then, the tape-attached glass sheet was overlapped with the bonding face of the other glass sheet and pressed using a clamp. Through the remaining input port, the adhesive composition prepared in the above (1) was introduced using a vinyl tube to fill an empty space. Thereafter, the input port and air vent in an open state were sealed using a hot-melt type sealant. Such a sealed assembly was irradiated for 45 minutes by UV rays having a main wavelength of 350 nm and output power of 40 W, hence completely curing the adhesive to produce a glass assembly product. Herein, a distance to the assembly was 30 μm and an interval between lamps was controlled to 10 cm.

Examples 2 to 19 and Comparative Examples 1 to 3

The same procedures described in Example 1 were repeated except that individual components and contents thereof listed in the following Table 1 were employed. Here, the content denotes parts by weight (wt. parts).

TABLE 1

| Section | Co-polymer | Diluted monomer | | | | | Content | Cross-linking agent | Photo-polymerization initiator | Silane coupling agent |
| --- | --- | --- | --- | --- | --- | --- | --- | --- | --- | --- |
| | | I (wt. %) | | | II (wt. %) | | | | | |
| | | 2-EHA | TMPTA | DPHA | AA | Ratio | | | | |
| Example 1 | 100 | 99.88 | 0.12 | — | 100 | 85.8/14.2 | 700 | 1 | 2 | 1 |
| Example 2 | 100 | 99.18 | 0.82 | — | 100 | 85.8/14.2 | 700 | 1 | 2 | 1 |
| Example 3 | 100 | 98.26 | 1.74 | — | 100 | 85.8/14.2 | 700 | 1 | 2 | 1 |
| Example 4 | 100 | 99.18 | 0.82 | — | 100 | 85.8/14.2 | 700 | 0.5 | 2 | 1 |
| Example 5 | 100 | 99.18 | 0.82 | — | 100 | 85.8/14.2 | 700 | 1.5 | 2 | 1 |
| Example 6 | 100 | 99.18 | 0.82 | — | 100 | 85.8/14.2 | 700 | 1 | 0.3 | 1 |
| Example 7 | 100 | 99.18 | 0.82 | — | 100 | 85.8/14.2 | 700 | 1 | 5 | 1 |
| Example 8 | 100 | 99.18 | 0.82 | — | 100 | 85.8/14.2 | 700 | 1 | 2 | 0.5 |
| Example 9 | 100 | 99.18 | 0.82 | — | 100 | 85.8/14.2 | 700 | 1 | 2 | 2 |
| Example 10 | 100 | 99.59 | 0.41 | — | 100 | 85.8/14.2 | 700 | 1 | 2 | 1 |
| Example 11 | 100 | 99.18 | 0.82 | — | 100 | 77.4/22.6 | 700 | 1 | 2 | 1 |
| Example 12 | 100 | 99.18 | 0.82 | — | 100 | 92.4/7.6 | 700 | 1 | 2 | 1 |
| Example 13 | 100 | 99.18 | 0.82 | — | 100 | 85.8/14.2 | 550 | 1 | 2 | 1 |
| Example 14 | 100 | 99.18 | 0.82 | — | 100 | 85.8/14.2 | 850 | 1 | 2 | 1 |
| Example 15 | 100 | 100 | — | — | 100 | 85.7/14.3 | 700 | 1 | 2 | 1 |
| Example 16 | 100 | 97.70 | 2.30 | — | 100 | 85.8/14.2 | 700 | 1 | 2 | 1 |
| Example 17 | 100 | 99.18 | 0.82 | — | 100 | 85.8/14.2 | 700 | 0.1 | 2 | 1 |
| Example 18 | 100 | 99.18 | 0.82 | — | 100 | 85.8/14.2 | 700 | 2 | 2 | 1 |
| Example 19 | 100 | 99.18 | — | 0.82 | 100 | 85.8/14.2 | 700 | 1 | 2 | 1 |

TABLE 1-continued

| | | Diluted monomer | | | | | | | |
|---|---|---|---|---|---|---|---|---|---|
| | | | I (wt. %) | | II | | | | |
| | Co- | | | | | | Cross- | Photo- | Silane |
| | poly- | 2- | TM | DP | (wt. %) | | Con- | linking | polymerization | coupling |
| Section | mer | EHA | PTA | HA | AA | Ratio | tent | agent | initiator | agent |
| Comparative Example 1 | 100 | 99.30 | 0.70 | — | — | 100/0 | 700 | 1 | 2 | 1 |
| Comparative Example 2 | 100 | — | — | — | 100 | 0/100 | 700 | 1 | 2 | 1 |
| Comparative Example 3 | 100 | 85.1 | 0.70 | 14.2 | — | 100/0 | 700 | 1 | 2 | 1 |

Copolymer: HSC-2025, Hansu Chemical (a dynamic viscosity of 3600 mPa · s at 25° C.)
2-EHA: 2-ethylhexyl acrylate
TMPTA: Trimethylolpropane triacrylate
DPHA: Dipentaerythritol hexaacrylate
AA: acrylic acid
Cross-linking agent: Isophorone diisocyanate (IPDI, BASF)
Photo-polymerization initiator: Irgacure 184 (Ciba)
Silane coupling agent: KBM-503: 3-methacryloxypropyl trimethoxysilane (KBM-503, Shinetsu)
Diluted monomer I: acrylic monomer having no hydroxyl group
Diluted monomer II: monomer having a hydroxyl group
* Ratio denotes a relative ratio between diluted monomer I and diluted monomer II to 100 wt. % of diluted monomer.

Experimental Example

Each of the adhesive compositions and glass assemblies prepared in the foregoing Examples and Comparative Examples was subjected to measurement of physical properties according to the following procedures, and results thereof are shown in TABLE 2.

1. Transmission (%)
Using a spectro-color meter (SE 2000), transmission was measured.

2. Haze (%)
Using a haze meter (HM-150), transmission was measured.

3. Strength (Impact Resistance, mm)
After mounting the fabricated glass assembly on a jig of a falling ball impact tester, a metal ball with a weight of 536 g was dropped from a predetermined height to a specific position of the mounted glass assembly. By measuring a drop height (mm) when the glass was broken, strength was assessed.

4. Heat-Resistant Durability (Bubble Growth Rate)
A glass assembly was prepared by the same procedures as described in Example 1 (2) except that, when the adhesive composition was introduced via a vinyl tube, bubbles were concurrently injected, thus fabricating the glass assembly. A test, wherein the prepared glass assembly is stored at 100° C. for 72 hours then left at room temperature for 3 hours, was performed. Bubble sizes before and after the test were determined and a difference in bubble sizes was calculated by Equation 1 below, in order to assess durability.

$$C\ (\%) = \frac{(B - A)}{A} \times 100 \qquad \text{[Equation 1]}$$

(in the equation, A denotes a bubble size before the test, B denotes the bubble size after test, C denotes variation in bubble sizes).

<Standards of Assessment>
⊚: −100%<C<5%
○: 5%≤C<15%
Δ: 15%≤C<25%
x: 25%≤C

TABLE 2

| Section | Transmission (%) | Haze (%) | Strength (mm) | Heat-resistant durability |
|---|---|---|---|---|
| Example 1 | 96.5 | 0.5 | 2900 | ⊚ |
| Example 2 | 97.8 | 0.2 | 3000 | ⊚ |
| Example 3 | 97.5 | 0.4 | 3000 | ⊚ |
| Example 4 | 97.9 | 0.3 | 2700 | ⊚ |
| Example 5 | 96.8 | 0.5 | 2400 | ⊚ |
| Example 6 | 97.1 | 0.4 | 2400 | ⊚ |
| Example 7 | 95.3 | 0.5 | 3000 | ⊚ |
| Example 8 | 95.2 | 0.4 | 2200 | ⊚ |
| Example 9 | 96.1 | 0.5 | 2500 | ⊚ |
| Example 10 | 96.5 | 0.4 | 2900 | ⊚ |
| Example 11 | 95.7 | 0.3 | 2700 | ⊚ |
| Example 12 | 97.9 | 0.5 | 3000 | ⊚ |
| Example 13 | 95.2 | 0.4 | 2200 | ⊚ |
| Example 14 | 97.9 | 0.3 | 2700 | ⊚ |
| Example 15 | 98.2 | 0.2 | 3300 | Δ |
| Example 16 | 96.4 | 0.3 | 2200 | Δ |
| Example 17 | 97.6 | 0.2 | 2900 | ○ |
| Example 18 | 95.2 | 0.5 | 2100 | ○ |
| Example 19 | 95.8 | 0.5 | 2500 | ○ |
| Comparative Example 1 | 56.8 | 9.4 | 1500 | ⊚ |
| Comparative Example 2 | 48.9 | 11.9 | 1900 | ⊚ |
| Comparative Example 3 | 89.5 | 3.8 | 2500 | ⊚ |

As shown in the above Table 2, each of the adhesive compositions and glass assemblies described in Examples 1 to 19 according to the present invention, which includes a urethane-acryl copolymer, a monomer mixture of an acrylic monomer having no hydroxyl group and a monomer having a hydroxyl group, an isocyanate cross-linking agent and a photo-polymerization initiator, had a higher transmission of 95% or more and a lower haze of 0.5% or less, compared to those described in Comparative Examples 1 to 3. Therefore, it can be understood that the foregoing material achieves excellent strength and heat-resistant durability without adversely effecting transmittance of a display panel. In particular, it was more effective that the acrylic monomer having no hydroxyl group is a mixture of a mono-functional monomer and a multi-functional monomer, especially, a 3-functional monomer, wherein weight ratio of these monomers is controlled to be within an optimum range.

Although exemplary embodiments of the present invention have been described for illustrative purposes, those skilled in the art will appreciate that various alterations and modification are possible, without departing from the scope and spirit of the present invention as disclosed in the appended claims.

What is claimed is:

1. A glass assembly comprising two glass sheets and a single layer of an adhesive layer interposed between the glass sheets, wherein the adhesive layer is formed by photo-curing an adhesive composition, the adhesive composition comprising:
   a urethane-acryl copolymer;
   a monomer mixture of an acrylic monomer having no hydroxyl group and a monomer having a hydroxyl group;
   an isocyanate cross-linking agent; and
   a photo-polymerization initiator,
   wherein the monomer mixture includes 75 to 95 weight % of the acrylic monomer having no hydroxyl group and 5 to 25 weight % of the monomer having a hydroxyl group based on the total weight of the monomer mixture.

2. The glass assembly according to claim 1, wherein the acrylic monomer having no hydroxyl group is a mixture of a mono-functional monomer and a multi-functional monomer.

3. The glass assembly according to claim 2, wherein the acrylic monomer having no hydroxyl group includes 95 to 99.9 weight % of the mono-functional monomer and 0.1 to 5 weight % of the multi-functional monomer based on the total weight of the acrylic monomer having no hydroxyl group.

4. The glass assembly according to claim 2, wherein the acrylic monomer having no hydroxyl group includes 98 to 99.9 weight % of the mono-functional monomer and 0.1 to 2 weight % of the multi-functional monomer based on the total weight of the acrylic monomer having no hydroxyl group.

5. The glass assembly according to claim 2, wherein the mono-functional monomer is at least one selected from a group consisting of n-butyl(meth)acrylate, 2-butyl(meth)acrylate, t-butyl(meth)acrylate, isobutyl(meth)acrylate, hexyl(meth)acrylate, 2-ethylhexyl(meth)acrylate, ethyl(meth)acrylate, methyl(meth)acrylate, n-propyl(meth)acrylate, isopropyl(meth)acrylate, pentyl(meth)acrylate, n-octyl(meth)acrylate, isooctyl(meth)acrylate, 2-methylbutyl(meth)acrylate, n-nonyl(meth)acrylate, isononyl(meth)acrylate, isoamyl(meth)acrylate, n-decyl(meth)acrylate, isodecyl(meth)acrylate, isobornyl(meth)acrylate, 4-methyl-2-pentyl(meth)acrylate, dodecyl(meth)acrylate, lauryl(meth)acrylate, 2-ethoxylethyl(meth)acrylate, 2-methoxyethyl(meth)acrylate and allyl(meth)acrylate.

6. The glass assembly according to claim 2, wherein the multi-functional monomer is at least one selected from a group consisting of 2 to 6-functional monomers.

7. The glass assembly according to claim 6, wherein the multi-functional monomer is a 3-functional monomer.

8. The glass assembly according to claim 1, wherein the monomer having a hydroxyl group is at least one selected from a group consisting of 2-hydroxyethyl(meth)acrylate; 2-hydroxylpropyl(meth)acrylate; 2-hydroxybutyl(meth)acrylate; 4-hydroxybutyl(meth)acrylate; 6-hydroxyhexyl(meth)acrylate; hydroxyalkyleneglycol(meth)acrylate having 2 to 4 carbon atoms in an alkylene group; (meth)acrylic acid; crotonic acid; maleic acid; itaconic acid; fumaric acid; 3-(meth)acryloyl propionate; a ring-opened adduct of succinic acid anhydride of 2-hydroxyalkyl(meth)acrylate having 2 to 3 carbon atoms in an alkyl group; a ring-opened adduct of succinic acid anhydride of hydroxyalkyleneglycol(meth)acrylate having 2 to 4 carbon atoms in an alkylene group; and a compound prepared by ring-opening addition type polymerization of a caprolactone adduct of 2-hydroxyalkyl(meth)acrylate having 2 to 3 carbon atoms in an alkyl group with succinic acid anhydride.

9. The glass assembly according to claim 1, wherein the monomer mixture is included in an amount of 500 to 1,000 weight parts based on 100 weight parts of the urethane-acryl copolymer in terms of solid contents.

10. The glass assembly according to claim 1, wherein the monomer mixture is included in an amount of 600 to 800 weight parts based on 100 weight parts of the urethane-acryl copolymer, in terms of solid content.

11. The glass assembly according to claim 1, wherein the diluted mixture monomer includes 80 to 90 weight % of an acrylic monomer having no hydroxyl group and 10 to 20 weight % of a monomer having a hydroxyl group.

12. The glass assembly according to claim 1, wherein the adhesive layer has a transmission of 95% or more and a haze of 0.5% or less.

13. An image display device including the glass assembly according to claim 1.

14. A glass assembly comprising two glass sheets and a single layer of an adhesive layer interposed between the glass sheets, wherein the adhesive layer is formed by photo-curing an adhesive composition, the adhesive composition comprising:
   a urethane-acryl copolymer;
   a monomer mixture of an acrylic monomer having no hydroxyl group and a monomer having a hydroxyl group, the acrylic monomer having no hydroxyl group comprising a mixture of a mono-functional monomer and a multi-functional monomer, wherein the acrylic monomer having no hydroxyl group includes 95 to 99.9 weight % of the mono-functional monomer and 0.1 to 5 weight % of the multi-functional monomer based on the total weight of the acrylic monomer having no hydroxyl group, and the monomer mixture includes 75 to 95 weight % of the acrylic monomer having no hydroxyl group and 5 to 25 weight % of the monomer having a hydroxyl group based on the total weight of the monomer mixture;
   an isocyanate cross-linking agent; and
   a photo-polymerization initiator;
   wherein the monomer mixture is included in an amount of 500 to 1,000 weight parts based on 100 weight parts of the urethane-acryl copolymer in terms of solid contents.

15. The glass assembly according to claim 14, wherein the mono-functional monomer is at least one selected from a group consisting of n-butyl(meth)acrylate, 2-butyl(meth)acrylate, t-butyl(meth)acrylate, isobutyl(meth)acrylate, hexyl(meth)acrylate, 2-ethylhexyl(meth)acrylate, ethyl(meth)acrylate, methyl(meth)acrylate, n-propyl(meth)acrylate, isopropyl(meth)acrylate, pentyl(meth)acrylate, n-octyl(meth)acrylate, isooctyl(meth)acrylate, 2-methylbutyl(meth)acrylate, n-nonyl(meth)acrylate, isononyl(meth)acrylate, isoamyl(meth)acrylate, n-decyl(meth)acrylate, isodecyl(meth)acrylate, isobornyl(meth)acrylate, 4-methyl-2-pentyl(meth)acrylate, dodecyl(meth)acrylate, lauryl(meth)acrylate, 2-ethoxylethyl(meth)acrylate, 2-methoxyethyl(meth)acrylate and allyl(meth)acrylate; and
   the monomer having a hydroxyl group is at least one selected from a group consisting of 2-hydroxyethyl(meth)acrylate; 2-hydroxylpropyl(meth)acrylate; 2-hydroxybutyl(meth)acrylate; 4-hydroxybutyl(meth)acrylate; 6-hydroxyhexyl(meth)acrylate; hydroxyalkyleneglycol(meth)acrylate having 2 to 4 carbon atoms in an alkylene group; (meth)acrylic acid; crotonic acid; maleic acid; itaconic acid; fumaric acid;

3-(meth)acryloyl propionate; a ring-opened adduct of succinic acid anhydride of 2-hydroxyalkyl(meth)acrylate having 2 to 3 carbon atoms in an alkyl group; a ring-opened adduct of succinic acid anhydride of hydroxyalkyleneglycol(meth)acrylate having 2 to 4 carbon atoms in an alkylene group; and a compound prepared by ring-opening addition type polymerization of a caprolactone adduct of 2-hydroxyalkyl(meth)acrylate having 2 to 3 carbon atoms in an alkyl group with succinic acid anhydride.

* * * * *